CHARLES L. LEONARD.
Improvement in Front-Gear for Carriages.
No. 126,720. Patented May 14, 1872.
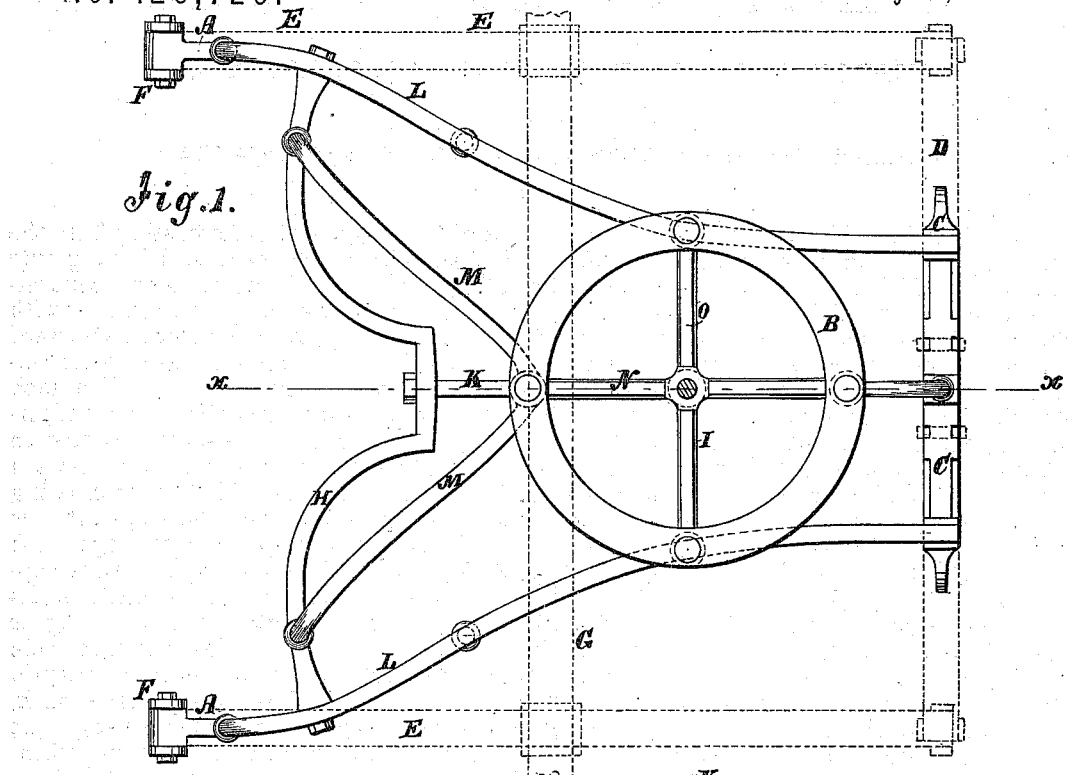
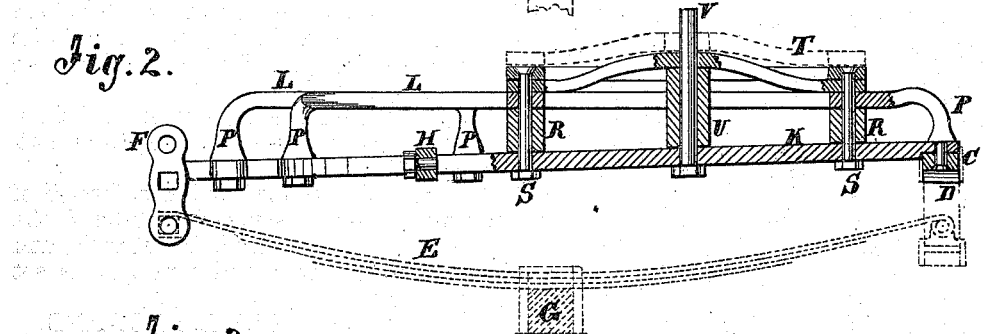
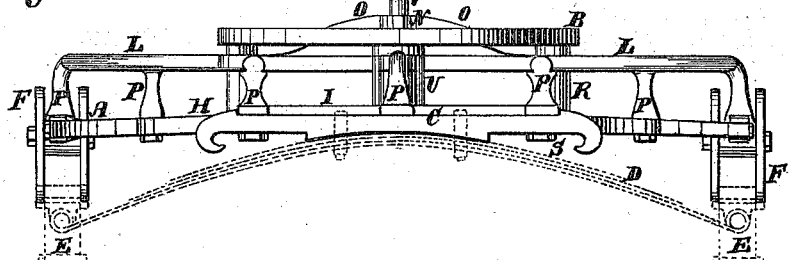
Witnesses:
A Bennerendorf.
N. A. Graham.
Inventor:
C. L. Leonard.
PER
Munn & Co.
Attorneys.

UNITED STATES PATENT OFFICE.

CHARLES L. LEONARD, OF WELLS' BRIDGE, NEW YORK.

IMPROVEMENT IN FRONT-GEAR FOR CARRIAGES.

Specification forming part of Letters Patent No. 126,720, dated May 14, 1872.

Specification describing a new and Improved Front-Gear for Carriages invented by CHARLES L. LEONARD, of Wells' Bridge, in the county of Otsego and State of New York.

My invention is an improvement in carriage-gear, and consists in the construction and arrangement hereinafter described and specifically indicated in the claim.

Figure 1 is a plan view of my improved front gear, with dotted lines showing the springs and axles. Fig. 2 is a section of Fig. 1 on the line $x$ $x$, also with dotted lines showing the springs; and Fig. 3 is a rear elevation.

Similar letters of reference indicate corresponding parts.

A represents the bar for supporting the fifth-wheel or circle; B C, the saddle for supporting said bars, being itself supported on the rear springs D. The front ends of the said bars A are supported on the front ends of the side springs by the clips F, and said springs E are mounted on the axle G. Now, I propose to apply the transverse connecting-bars or stays H I, and the longitudinal bar K to these bars A and the saddle C, as shown, in the same plane, for connecting and bracing them laterally, and all these parts, except the saddle, I propose to brace vertically by the stays L M N O, arranged considerably above said bars, and, for the most part, parallel with them, and connected to them by the vertical studs P, forged together with said stays, and having screw-threaded bolts Q formed on the ends passing through holes in said bars, and made fast by nuts below; or, in some places, I bolt the bars and stays together by long bolts S, passing through sleeves or tubes R, and by these same bolts I attach the circle or fifth-wheel B to the upper sides of the stays, said bolts passing from the top of said circle downward, and having nuts screwed on below. The bolt-holes are countersunk in the circle to let the bolts down flush with the top. The stays N O, bend or rise upward from where the circle rests on them to the center where they cross or are attached to each other to form a seat thereat for the central portion of the other circle T—shown dotted in Fig. 2—and a longer sleeve or tube, U, between said stays and the bars I K at their crossing than the other sleeves, and the king-bolt V is fitted in said sleeve, passing through both bars and stays. The king-bolt is thus supported laterally throughout so much of its length that it is prevented from vibrating or tilting over sidewise, as it does when the hole or tube through which it passes has less depth. By this arrangement I get very great strength, both vertically and laterally, with very light bars and stays, and the king-bolt is very firmly supported against being swayed laterally in its support by the carriage-body. The shafts or thills will be connected or attached to this frame by the clips F.

Having thus described my invention, I claim as new and desire to secure by Letters Patent—

The improved gear for carriages, formed of the curved king-bolt, stays N O, tube V, the circle B, stays H L M, studs P, tubes R, and bars A, all constructed and arranged as set forth and shown.

CHARLES L. LEONARD.

Witnesses:
EDWARD L. GREEN,
ALBERT BIRDSALL.